(12) United States Patent
Swift

(10) Patent No.: US 11,383,453 B2
(45) Date of Patent: Jul. 12, 2022

(54) METHODS OF REPAIRING AND WATERPROOFING ARTICLES

(71) Applicant: Swift IP, LLC, Weston, FL (US)

(72) Inventor: Philip Swift, Weston, FL (US)

(73) Assignee: Swift IP, LLC, Weston, FL (US)

( * ) Notice: Subject to any disclaimer, the term of this patent is extended or adjusted under 35 U.S.C. 154(b) by 52 days.

(21) Appl. No.: 16/778,014

(22) Filed: Jan. 31, 2020

(65) Prior Publication Data

US 2020/0164599 A1 May 28, 2020

Related U.S. Application Data

(62) Division of application No. 15/405,169, filed on Jan. 12, 2017, now abandoned.

(51) Int. Cl.
*B29C 65/50* (2006.01)
*B29C 65/00* (2006.01)
(Continued)

(52) U.S. Cl.
CPC .............. *B29C 65/50* (2013.01); *B29C 66/01* (2013.01); *B63B 3/04* (2013.01); *B63B 73/00* (2020.01);
(Continued)

(58) Field of Classification Search
CPC ............................ F16L 55/168; Y10T 428/20; Y10T 137/0452; Y10T 156/1033; Y10T 29/49746; B29C 73/00; B29C 65/5057; B29C 66/01; C09J 107/00; B32B 2556/00; B32B 27/04; B63B 43/16; B63B 9/00; B63B 2009/008; B63B 59/00; B63B 2221/10; B63B 2231/40; B63B 3/04; C09K 3/12; B65D 2590/0075; B29L 2031/3067
(Continued)

(56) References Cited

U.S. PATENT DOCUMENTS 2,412,455 A * 12/1946 Hall, Jr. .................... B63B 5/06
114/358
2,508,304 A * 5/1950 Sturtevant ................ B63B 7/08
114/345
(Continued)

FOREIGN PATENT DOCUMENTS

EP 2853477 A1 * 4/2015 ............... B63B 9/04
GB 933939 A * 8/1963 ......... B29C 66/7212
(Continued)

OTHER PUBLICATIONS

National Inventors Hall of Fame, "Featured Exhibit: Experience Automotive Innovation with the Ford Mustang," 2016, https://www.invent.org/blog/innovation-display/featured-exhibit-ford-mustang . (Year: 2016).*
(Continued)

*Primary Examiner* — Philip C Tucker
*Assistant Examiner* — Brian R Slawski
(74) *Attorney, Agent, or Firm* — Banner & Witcoff, Ltd.

(57) ABSTRACT

A relatively thick, rubberized adhesive tape is applied to an article to repair, patch, bond, seal, or waterproof the article, to join two or more articles, and/or to modify the appearance and/or physical properties of the article, such as by thermal insulation, shock resistance, vibration resistance, electrical insulation, and the like.

8 Claims, 8 Drawing Sheets

(51) Int. Cl.
| | | |
|---|---|---|
| B63B 73/00 | (2020.01) | |
| B63B 3/04 | (2006.01) | |
| B29L 31/30 | (2006.01) | |
| B63B 81/00 | (2020.01) | |
| B63B 73/46 | (2020.01) | |

(52) U.S. Cl.
CPC ...... B29C 65/5042 (2013.01); B29C 65/5057 (2013.01); B29C 66/1142 (2013.01); B29C 66/54 (2013.01); B29L 2031/3067 (2013.01); B63B 73/46 (2020.01); B63B 81/00 (2020.01); B63B 2221/10 (2013.01); B63B 2231/40 (2013.01)

(58) Field of Classification Search
USPC ......... 156/60, 94, 95, 97, 98, 145, 156, 278, 156/280, 293, 297, 325, 326, 327, 333, 156/334, 338, 304.1, 304.2, 304.3; 137/15.08, 15.11; 138/97, 98, 99; 428/63, 57, 58, 61; 166/285, 292, 294, 166/295; 264/36.15, 36.16; 29/402.01, 29/402.09; 114/61.15, 227, 228, 229, 114/343, 355, 360, 361
See application file for complete search history.

(56) References Cited

U.S. PATENT DOCUMENTS

| | | | | |
|---|---|---|---|---|
| 2,941,216 | A * | 6/1960 | Carlson | B63B 5/24 |
| | | | | 114/359 |
| 3,048,858 | A * | 8/1962 | Frederica | B63B 3/04 |
| | | | | 114/356 |
| 4,094,027 | A * | 6/1978 | Vernon | B29C 66/14 |
| | | | | 114/357 |
| 4,118,814 | A * | 10/1978 | Holtom | B29C 66/124 |
| | | | | 114/357 |
| 5,348,801 | A | 9/1994 | Venzi et al. | |
| 5,517,939 | A * | 5/1996 | Harman | B63B 7/082 |
| | | | | 114/345 |
| 5,894,864 | A | 4/1999 | Rich | |
| 6,283,058 | B1 * | 9/2001 | Wiltrout | B29C 44/56 |
| | | | | 114/352 |
| 6,490,990 | B1 * | 12/2002 | Hamlyn | B63B 32/57 |
| | | | | 114/357 |
| 7,610,870 | B1 * | 11/2009 | Zaseybida | B63B 34/05 |
| | | | | 114/77 R |
| 2004/0079268 | A1 * | 4/2004 | Lambregts | B63B 73/10 |
| | | | | 114/65 R |
| 2004/0261937 | A1 * | 12/2004 | Pellicer | B63B 73/74 |
| | | | | 156/242 |
| 2009/0280284 | A1 * | 11/2009 | Pellegrini | B29C 65/4815 |
| | | | | 428/57 |
| 2015/0053129 | A1 * | 2/2015 | Ohman | B29C 49/4205 |
| | | | | 264/535 |
| 2015/0367915 | A1 * | 12/2015 | Edu | B63B 25/14 |
| | | | | 114/74 R |

FOREIGN PATENT DOCUMENTS

| | | | | | |
|---|---|---|---|---|---|
| GB | 2053085 | A | * | 2/1981 | ............... B63B 7/08 |
| JP | 57056239 | A | * | 4/1982 | |
| JP | 07329876 | A | * | 12/1995 | |
| JP | 2000025685 | A | * | 1/2000 | |
| WO | WO 85/02143 | | * | 5/1985 | |
| WO | WO-8502143 | A | * | 5/1985 | |
| WO | WO 8502143 | A | * | 5/1985 | |

OTHER PUBLICATIONS

United States Patent & Trademark Office, "National Inventors Hall of Fame Museum at USPTO: Special Delivery," May 3, 2016, https://www.youtube.com/watch?v=5CIZIk3WoGw . (Year: 2016).*

Fluid Sealing Service, "Tapes: Pressure and Butyl," pp. 1-2. Archived Aug. 18, 2012. Retrieved at https://web.archive.org/web/20120818001655/http://www.fluidsealingservice.com/Tapes%20Pressure%20and%20Butyl.htm (Year 2012).

The Great Outdoors, "Safety—How do you patch/repair an inflatable dinghy while still underway?," pp. 1-2. Cited passages published May 27-28, 2016. Retrieved at https://outdoors.stackexchange.com/questions/11859/how-do-you-patch-repair-an-inflatable-dinghy-while-still-underway (Year: 2016).

The Hull Truth, "Do you carry emergency hull repair materials", pp. 1, 7. Cited passages published Mar. 25-26, 2014. Retrieed at https://www.thehulltruth.com/northeast/576631-do-you-carry-emergency-hull-repair-materials.html (Year: 2014).

Pool Leak Pros, "Leak Detection Process," p. 1. Archived Aug. 11, 2015 Retrieved at https://web.archive.org/web/20150811000002/http://www.poolleakpros.com/leak-detection-process-html (Year: 2014).

* cited by examiner

METHODS OF REPAIRING AND WATERPROOFING ARTICLES

CROSS-REFERENCE TO RELATED APPLICATION

This application is a division of U.S. application Ser. No. 15/405,169, filed Jan. 12, 2017, which application is hereby incorporated by reference in its entirety.

BACKGROUND

Aerosol-propelled rubber compositions, such as FLEX SEAL®, and liquid rubber compositions, such as FLEX SEAL® LIQUID, sold by Swift Response LLC, have been used by consumers for waterproofing and repairing household articles. It would be desirable to develop alternative techniques for repairing or modifying household articles, sporting equipment, motor vehicles, appliances, portions of homes and associated structures, and the like, to improve the appearance, properties, and/or performance of the article while deferring the expense of replacing the article. It would be particularly desirable to develop techniques which are safe and easy-to-use for consumers.

SUMMARY

Aspects of the invention involve techniques in which a relatively thick, rubberized adhesive tape is applied and conforms to the shape of an article to create a flexible waterproof barrier. The tape may be applied to a wide variety of surfaces, non-limiting examples of which include plastic, metal, wood, stucco, plaster, brick, concrete, glass, rubber, tile, fiberglass, ceramic, porcelain, canvas, stone, and drywall. The tape may be used to repair, patch, bond, seal, and/or waterproof various types of articles, non-limiting examples of which include roofs, gutters, boats, kayaks, personal watercraft, canoes, rafts, inflatable articles such as toys, sporting equipment, and air mattresses, outdoor equipment, mobile homes, recreational vehicles, campers, garden hoses, low-pressure PVC and plumbing pipes, tents, vinyl awnings, covers and tarps, above-ground swimming pools, windows, doors, walls, seams, vents, air ducts, HVAC systems, and the like.

BRIEF DESCRIPTION OF THE DRAWINGS

A more complete understanding of the present invention and certain advantages thereof may be acquired by referring to the following detailed description in consideration with the accompanying drawings, in which:

FIG. 3A shows a boat hull that has been cut in half lengthwise. FIG. 3B shows the reassembled hull having an adhesive tape applied to the inside surface of the hull. FIG. 3C shows the reassembled hull having an adhesive tape applied to the outside surface of the hull.

DETAILED DESCRIPTION

A relatively thick, rubberized adhesive tape (sometimes referred to herein simply as "tape") may be used in a variety of techniques involving repair or other modification of various articles such as roofs, gutters, boats, kayaks, personal watercraft, canoes, rafts, inflatable articles such as toys, sporting equipment, and air mattresses, outdoor equipment, mobile homes, recreational vehicles, campers, garden hoses, low pressure PVC and plumbing pipes, tents, vinyl awnings, covers and tarps, above-ground swimming pools, windows, doors, walls, seams, vents, air ducts, HVAC systems, and the like.

The tape is highly flexible, allowing it to readily conform to the shape of the article to which it is applied. The adhesive layer is capable of forming a strong bond with a variety of surfaces under a variety of conditions. In some examples, the tape is applied to a surface that is in contact with water, so that leaks may be repaired in articles such as aquariums, above-ground swimming pools, hot tubs, or inflatable pools, for example, without the need for draining them prior to repair. It also is possible to affect underwater repairs such as repairing leaks in waterborne vessels, docks, or the like.

In some examples, a tape is applied to an article for purposes of waterproofing, including repairing holes or leaks in the article, or modifying the article to make it waterproof by covering preformed holes or by adding a moisture-impermeable layer to the article or a portion thereof. In other examples, a tape is applied to an article for purposes of changing the physical properties and/or aesthetics of the article. For example, a tape may be applied to an article, or a portion thereof, to introduce properties such as thermal insulation, electrical insulation, shock resistance, vibration resistance, and the like. The tape generally may provide a durable, breathable, weatherproof barrier that is resistant to rain, snow, sun, wind, air moisture, UV degradation, and natural weathering over a wide temperature range. Aesthetic modifications may include, for example, altering the color and/or texture of an article, and/or applying indicia, stripes, logos, or the like to an article or portion thereof.

Figure 1:
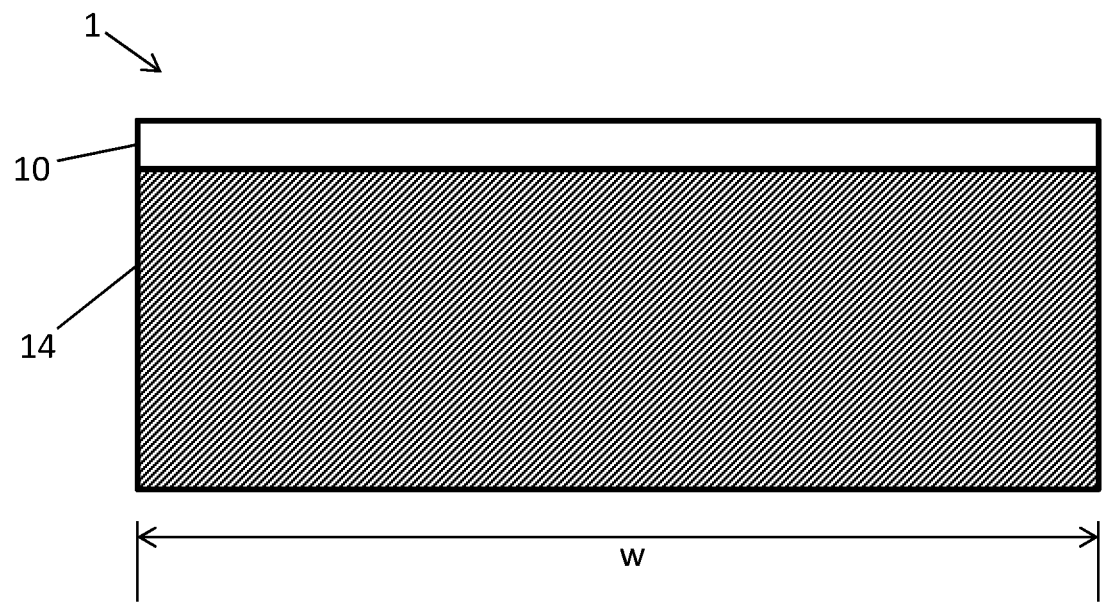
FIG. 1 is a cross-sectional illustration of a rubberized adhesive tape that may be used in accordance with various aspects disclosed therein.

FIG. 1 schematically shows a cross-sectional view of a tape 1 that may be used in various methods disclosed herein. The tape 1 includes a relatively thick, rubberized adhesive layer 14 and a backing layer 10. Optionally, a release liner (not shown) is placed over the opposite surface of the adhesive layer 14 to protect the adhesive layer before use. Usually, a release liner is not used, but instead the tape is wound into a roll such that the backing layer 10 covers and protects the adhesive layer 14 until such time that the adhesive layer is exposed by unrolling the tape.

The dimensions of the layers are not particularly limited and may vary widely. The rubberized adhesive layer 14 should have an appropriate thickness to provide the desired adhesive, waterproofing, moisture barrier, insulating, and/or reinforcing properties needed for a particular application. By way of non-limiting example, the thickness of the adhesive layer 14 may range from about 5 to about 50 mils, more often from about 10 to about 40 mils, and typically ranges from about 15 to about 30 mils. The thickness of the backing layer 10 typically is less than that of the adhesive layer. For example, the thickness of the backing layer 10 may range from about 1 to about 20 mils, more usually from about 2 to about 15 mils, and often from about 3 to about 10 mils. In one example, the adhesive layer 14 has a thickness of 21 mils and the backing layer has a thickness of 6 mils.

The overall width w of the tape may be appropriately selected depending on intended applications, and often ranges from about 2 to about 18 inches, more usually from about 4 to about 15 inches, from about 5 to about 13 inches, or from about 6 to about 12 inches. In some examples, a super-wide tape is used, e.g., 12" width, which provides additional strength and waterproofing that enable a much wider range of applications than heretofore were possible, particularly applications needing higher adhesive strength and/or when the tape is applied to a surface in the presence of water, including flowing water. Non-limiting examples of tape widths include 4", 8" and 12". Discrete lengths of the tape (5' or 10', for example) may be wound into rolls for ease of distribution and handling.

Figure 2:
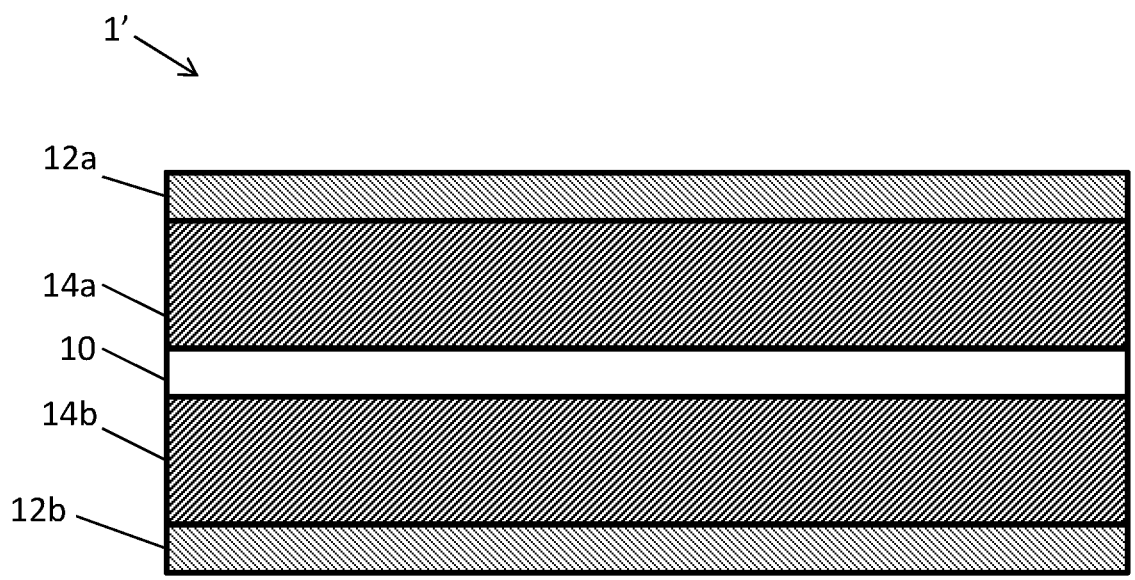
FIG. 2 is a cross-sectional illustration of a two-sided rubberized adhesive tape that may be used in accordance with alternative aspects disclosed therein.

FIG. 2 illustrates an alternative embodiment in which a two-sided adhesive tape 1' is used. The tape 1' includes a first adhesive layer 14a and a second adhesive layer 14b provided on opposite surfaces of the backing layer 10. A release liner 12a, 12b may be applied to one or both adhesive layers 14a, 14b to facilitate winding of the tape into rolls. The release liner(s) 12a, 12b are removed prior to use to expose the adhesive layers 14a, 14b. The two-sided adhesive tape 1' may be useful in various applications in which it is desired to join opposing surfaces together, such as in the joining of pipe fittings or the like.

The particular type of adhesive used is not limited provided that it has sufficiently high adhesive strength and water resistance characteristics. A number of waterproof adhesives are commercially available. Acrylic adhesives, e.g., cyanoacrylates such as methyl-2-cyanoacrylate and ethyl-2-cyanoacrylate, adhere well to a range of materials such as wood, metal, glass, plastic, and various other surfaces, hold up well to moisture and drastic temperature changes, and generally are resistant to ultraviolet light, solvents, and chemicals. Synthetic rubber adhesives may be based on ethylene propylene diene monomer (EPDM) rubber, ethylene propylene rubber, styrene-butadiene rubber (SBR), rubbers prepared from isoprene (2-methyl-1,3-butadiene), chloroprene (2-chloro-1,3-butadiene), or from isobutylene with a small percentage of isoprene for crosslinking, and polyether-based silane-terminated polymers. In one example, a thermoplastic butyl hybrid adhesive is used. If desired, the rubber layer may be formulated in a variety of colors tailored to particular applications or consumer preferences. For example, rubber compositions may be clear, white, off-white, black, gray, blue, green, red, almond, brown, silver, yellow, terra cotta, or other suitable color. The selection of appropriate pigment(s) or other colorant(s) needed to achieve a desired color will be apparent to persons skilled in the art with the aid of no more than routine experimentation.

The backing layer 10 functions to support the adhesive layer 14 and to provide a non-adhesive surface to the tape 1, e.g., to provide an outer surface of a patch after application over a damaged area. The composition of the backing layer 10 is not particularly limited, but generally should be compatible with the adhesive layer. For example, the backing layer may be constructed from a polyolefin such as polyethylene.

Release liners (when used) may be prepared from suitable materials such as paper, polycoated paper, polyester film, or polyolefin (e.g., high density polyethylene (HDPE)) film. The release liner may feature a release coating, such as a silicone release coating, to create a low-tack bond with the adhesive layer.

Figure 3A:
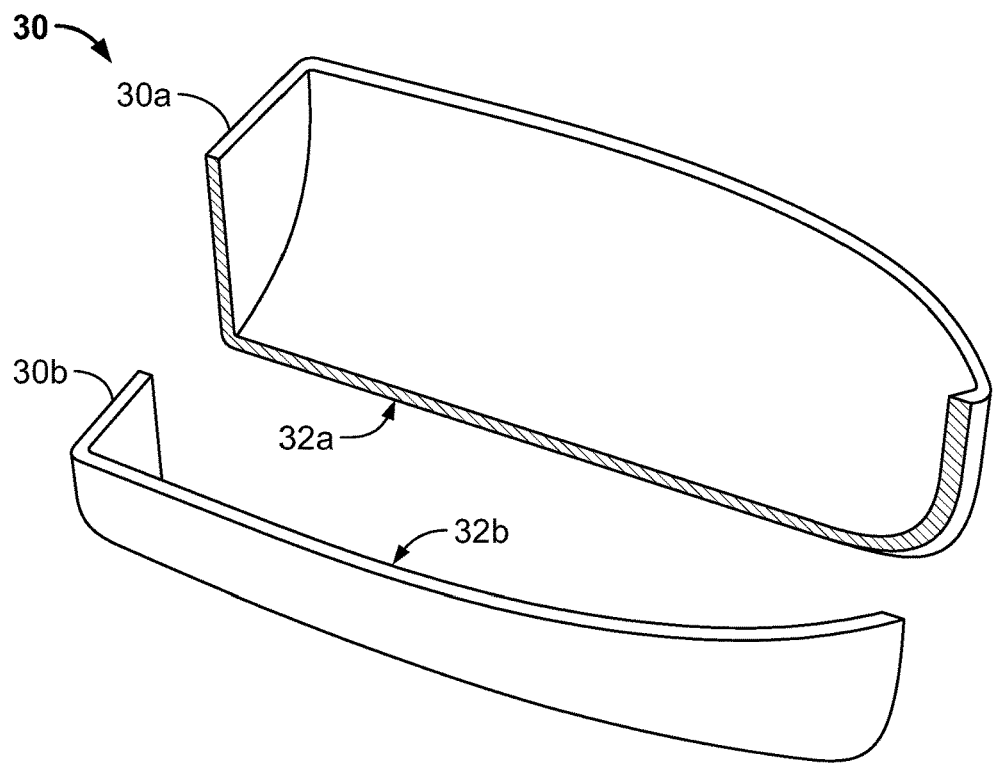
FIGS. 3A-3C illustrate a method of dissecting and repairing a boat hull.
Figure 3B:
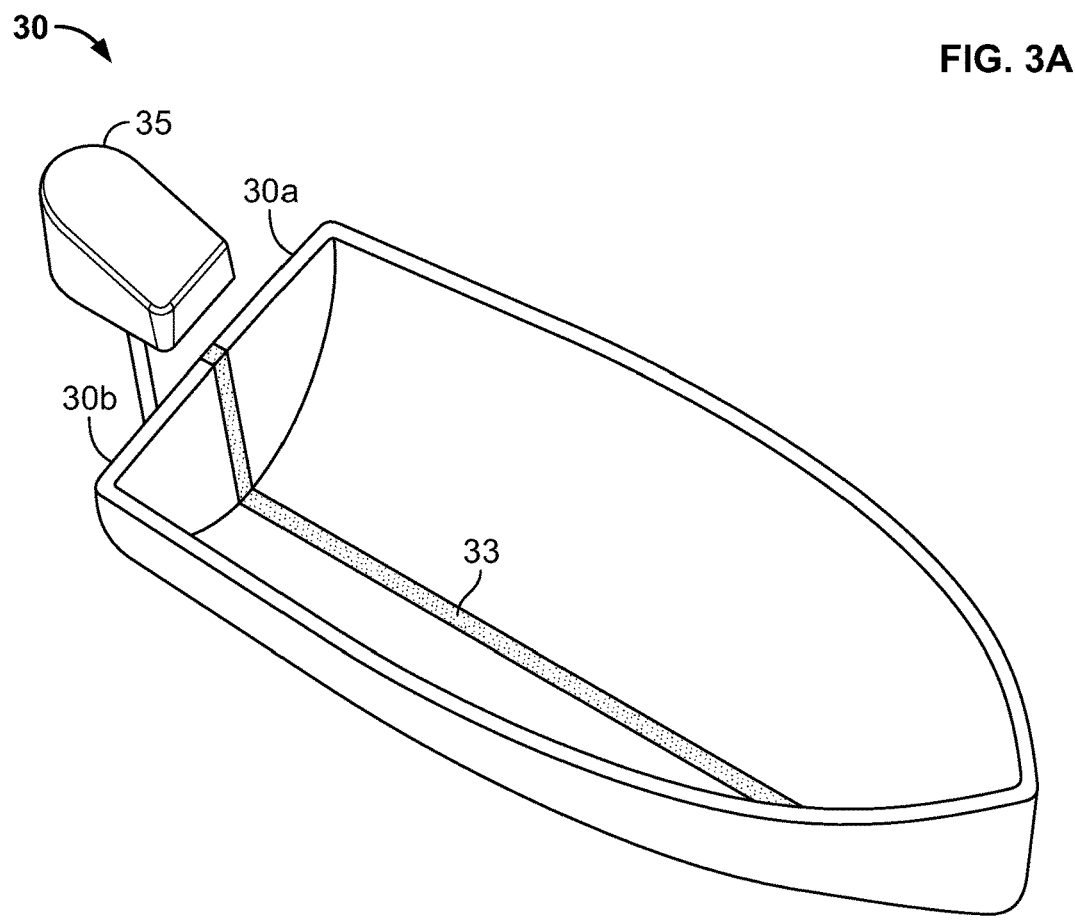
Figure 3C:
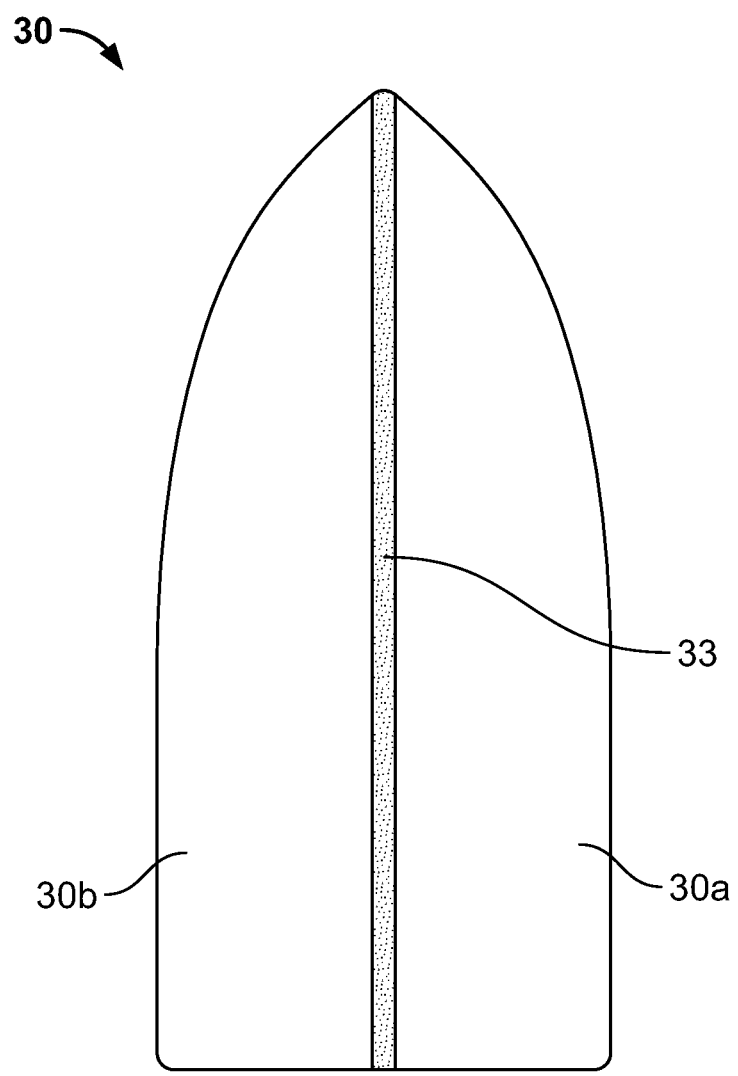

In one aspect, as schematically shown in FIGS. 3A-B, a 12"-wide tape is used to secure first 30a and second 30b sections of a boat hull 30 together in a watertight fashion. A 10-foot boat hull 30 is separated into first 30a and second 30b sections by cutting with a circular saw, laser, or the like. In the example shown in FIG. 3, the hull 30 is cut in half lengthwise to form a first exposed edge 32a along the first section 30a and a second exposed edge 32b along the second section 30b. The two hull sections 30a, 30b then may be rejoined to form a reassembled vessel by placing the first exposed edge 32a into abutting contact with the second exposed edge 32b. With reference to FIGS. 3B and 3C, the rubberized adhesive tape 33 is placed onto the first 30a and second 30b sections in the area where they intersect, e.g., with approximately half the width of the tape 33 adhering to each hull section 30a, 30b. A length of the tape 33 may be applied to the outside surface of the hull sections 30a, 30b, as illustrated in FIG. 3C, and/or to the inside surface of the hull sections 30a, 30b, as illustrated in FIG. 3B. The tape 33 provides a watertight seal and sufficient strength to allow the boat to be operated in water, e.g., via an outboard motor 35, while carrying a passenger.

Figure 4A:
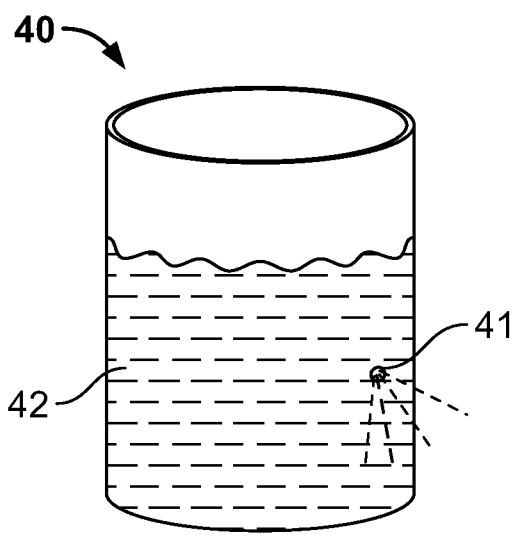
FIGS. 4A and 4B illustrate a method of repairing a leak in a liquid container such as a liquid storage tank.
Figure 4B:
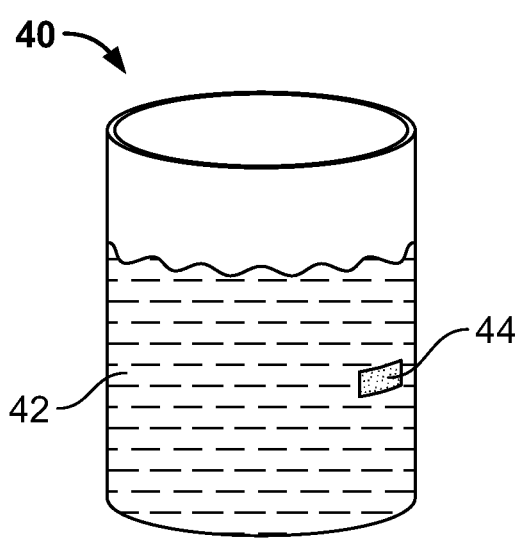

FIGS. 4A and 4B illustrate another aspect involving the repair of a leak in a liquid container 40, e.g., a 5- or 10-gallon bucket, 55-gallon drum, or large storage tank. The container 40 contains water 42 or other liquid, which is discharged through aperture 41. The aperture 41 may be circular, as shown in FIG. 4A, or may be of various other shapes such as an elongated gash, for example, or may be irregularly shaped depending on the source of damage to the container. In the case of FIG. 4A, a circular hole 41 approximately 1" in diameter was drilled into the container 40. While the water 42 is being discharged through the aperture 41, a tape segment 44 is secured to the container so as to cover the aperture 41. The dimensions of the tape segment 44 should be selected so that the aperture 41 is completely covered as well as a sufficiently large area surrounding the aperture 41 that allows a watertight seal to be created. By way of example, the surface area of the tape segment 44 may be about 200% or more of the surface area of the aperture 41. A circular aperture 41 having a diameter of 1", e.g., may be covered by a tape segment 44 of approximately 4"×6". As shown in FIG. 4B, after its application, the tape segment 44 is effective to prevent further discharge of water through the aperture 41.

Figure 5A:
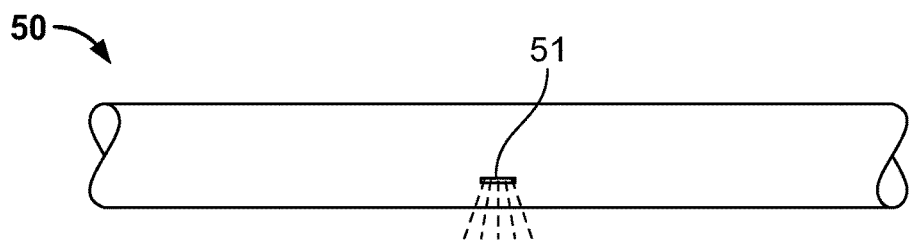
FIGS. 5A and 5B illustrate a method of repairing a leak in a conduit such as a PVC pipe.
Figure 5B:
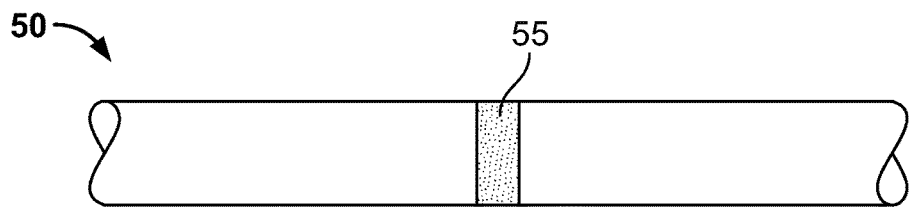

FIGS. 5A and 5B schematically illustrate the repair of a conduit 50 such as a PVC pipe, garden hose, pool or hot tub filter hose, or the like. The conduit 50 has an aperture 51 therein through which water or other liquid is discharged, as shown in FIG. 5A. While water is being discharged through the aperture, a length of tape 55 is applied to the conduit 50 to cover the aperture 51 and create a watertight seal. The dimensions of the tape 55 may be appropriately selected depending on the size and shape of the aperture 51. As shown in FIG. 5B, it may be advantageous to wrap the tape 55 around the conduit 50 one or more times to create the watertight seal, thereby preventing further discharge of water through the aperture 51. For example, a 6" wide tape 55 may be wound around the conduit 50 once or twice to repair an approximately 2" wide gash in the conduit 50.

Figure 6A:
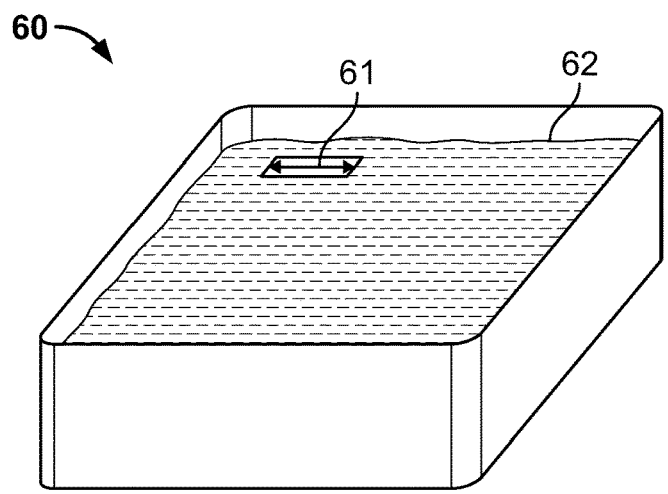
FIGS. 6A and 6B illustrate a method of repairing a water-containing structure such as an above-ground swimming pool.
Figure 6B:
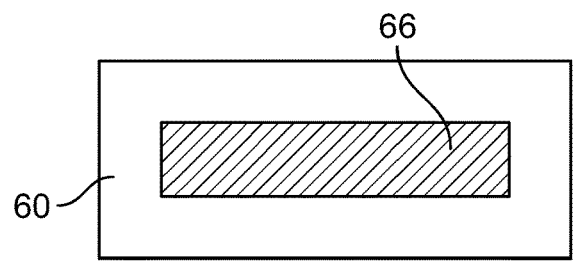

FIGS. 6A and 6B schematically illustrate a method of repairing a leak in a water-containing structure 60 such as an above-ground swimming pool, hot tub, or aquarium. An aperture 61 that exists below the water level 62 is repaired by securing a length of tape 66 over the aperture 61 to create a watertight seal. The tape 66 may be applied to the inside surface of the structure 60 even though the aperture 61 is surrounded by water. Thus, it is not necessary to drain the water from the structure 60 before making the repair. The dimensions of the tape segment 66 should be selected so that the aperture 61 is completely covered as well as a sufficient area surrounding the aperture 61 to allow formation of a watertight seal. If desired, another length of tape may be applied to the outside surface of the structure 60 covering the aperture 61 to reinforce the watertight seal.

Figure 7A:
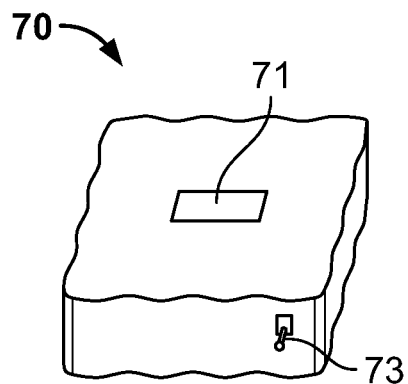
FIGS. 7A and 7B illustrate a method of repairing an inflatable article such as a mattress.
Figure 7B:
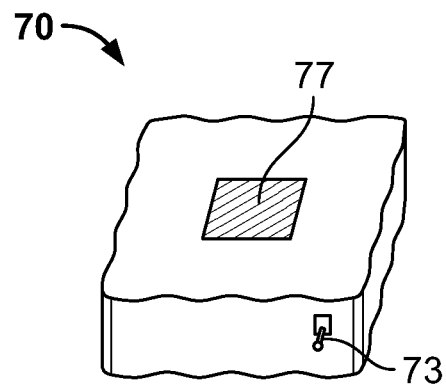

FIGS. 7A and 7B schematically illustrate repairing an inflatable article 70 such as a raft, game ball, mattress, toy, kiddie pool, or the like. FIG. 7A shows an article 70 which has become partially or entirely deflated as a result of air escaping through an aperture 71 along the body of the article 70. A segment of tape 77 is applied to the article 70 so as to cover the aperture 71 and a surrounding area. The article 70 then may be inflated by introducing pressurized air, e.g., from a pump or directly from the lungs, through a valve 73. The tape 77 provides an airtight seal such that the inflated article 70 does not become deflated.

Figure 8:
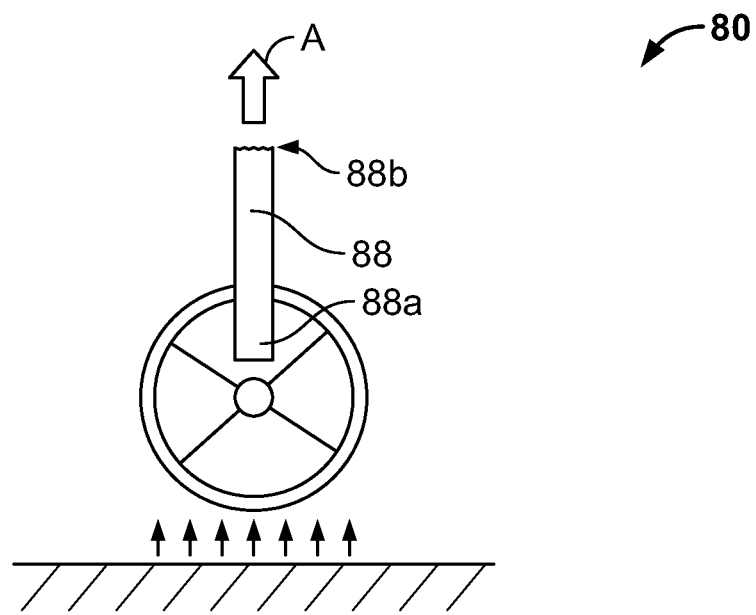
FIG. 8 illustrates a method of testing the adhesive strength of a rubberized adhesive tape by securing one end of the tape to a free weight and lifting the other end of the tape.

In another aspect, as shown schematically in FIG. 8, a method of testing the adhesive strength of a rubberized adhesive tape 88 is provided. A first end 88a of the length of tape is adhered to a portion of a free weight 80, such as a 45-pound free weight as illustrated in FIG. 8, or a free weight of other amount, e.g., 5-, 10-, 20-, 25-, or 35-pound weight. A person (not illustrated) grabs a second end 88b of the tape and lifts the tape upward, as depicted by arrow "A" in FIG. 8. Lifting the second end 88b of the tape in this manner is effective to raise the free weight 80 off of the ground and remain supported only by the tape 88, as shown in FIG. 8. This technique, as just described, alternatively may be characterized as a method of lifting a free weight.

Figure 9A:
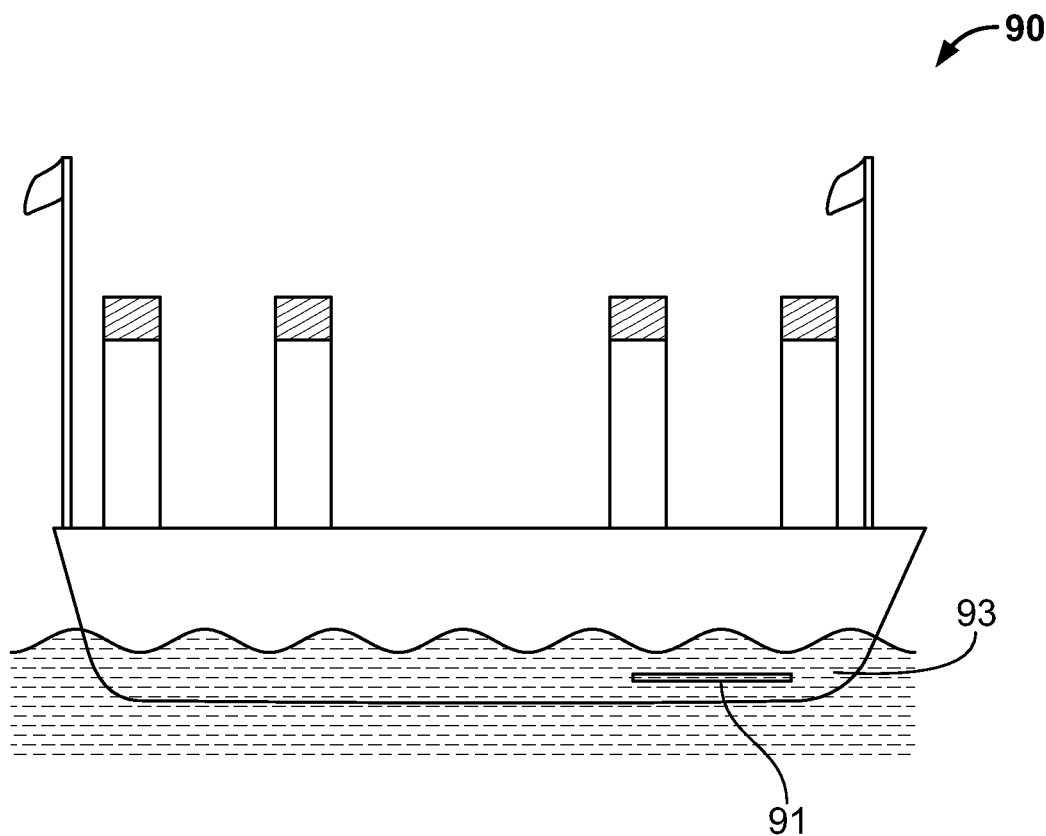
FIGS. 9A and 9B illustrate a method of making underwater repairs to a partially submerged vessel.
Figure 9B:
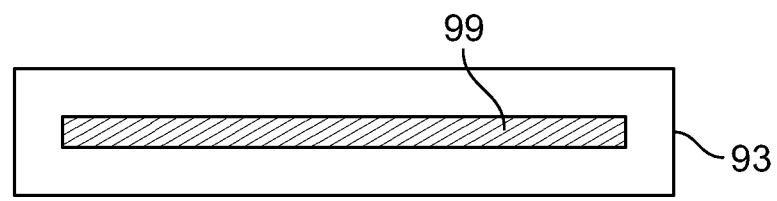

In other aspects, the tape may be used for underwater repairs, as shown schematically in FIGS. 9A and 9B. FIG. 9A shows a vessel 90 having a partially submerged hull 93. An aperture 91 is formed in the submerged portion 93, which may be an elongated gash as depicted in FIG. 9A. A segment of tape 99 of appropriate dimensions is applied onto the submerged hull 93 covering the aperture 91 to create a watertight seal. The tape 99 may be applied to the outside surface of the hull 93, as shown in FIG. 9B. Another segment of tape (not illustrated) may be applied to the inside surface of the hull 93 covering the aperture 91 to reinforce the watertight seal.

Figure 10A:
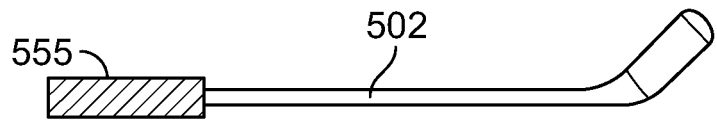
FIGS. 10A-10D illustrate techniques involving the modification of a hockey stick, baseball bat, golf club, and skateboard, respectively.

In another aspect, as illustrated in FIGS. 10A-10D, the tape is applied to an article of sporting equipment with a handle or shaft such as a hockey stick 502, baseball bat 510, crochet mallet, golf club 520, or a tennis, badminton or racquetball racquet, or to other sporting equipment such as a skateboard 532. In some examples, the tape is applied to grip portion(s) to improve gripping properties and/or provide thermal insulation, shock resistance, vibration resistance, etc. In other examples, the tape is applied to non-grip portion(s) of the article of sports equipment. As shown in FIG. 10A, the tape 555 may be applied along the grip portion (as shown) or along other portions of the shaft or blade of a hockey stick 502 for increasing gripping and tactile properties, for aesthetic purposes, and/or to modify the flex properties of the shaft, e.g., by increasing flexural stiffness.

Figure 10B:

As shown in FIG. 10B, the tape is applied to a baseball bat 510. For example, a length of tape 555 may be wrapped around the handle portion of the baseball bat for increasing gripping and tactile properties, for reducing vibrations that are transmitted back to the user, and/or for aesthetic purposes.

Figure 10C:
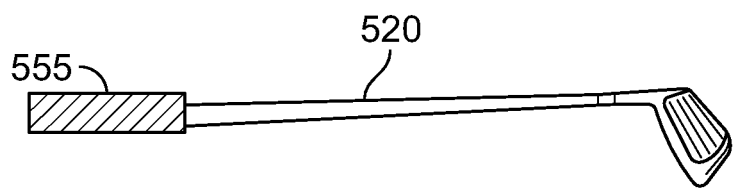

FIG. 10C illustrates applying the tape 555 to a golf club 520. Grips on golf clubs have been known to rip or undesirably wear. The tape may be applied to the grip portion of a golf club, either directly to the shaft or over an existing grip, to provide an enhanced grip. For example, the tape may be wrapped around the grip portion of the golf club for increasing gripping and tactile properties, for reducing vibrations that are transmitted back to the golfer, and/or for aesthetic purposes. Multiple layers of the tape may be applied, as desired, to increase the thickness of the grip.

Figure 10D:
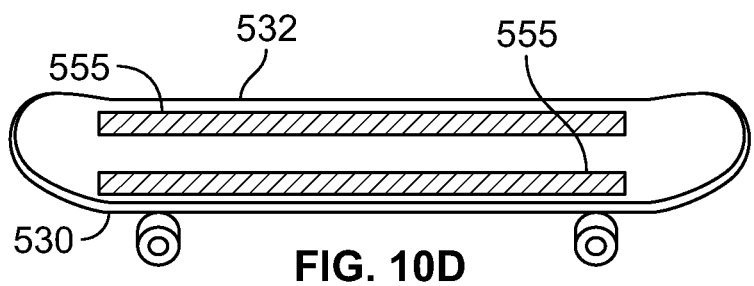

FIG. 10D illustrates applying segments 555a, 555b of the tape to a skateboard 530, such as to the upper surface 532 thereof. Skateboarders commonly tape sandpaper-like material to the upper surface of skateboards to enhance the grip between shoes and the skateboard while skating. However, the sandpaper-like texture adds to the wear of both the upper and the sole of the user's footwear. As shown in FIG. 10D, one or more segments of tape 555a, 555b may be applied to the upper surface 532 of the skateboard 530 for providing increasing gripping and tactile properties, and/or for aesthetic purposes. The rubberized upper surface 532 provides an enhanced grip that may have less of a negative impact on the wear of shoes. In addition to providing an improved gripping surface, the tape may provide other benefits to the skateboard 530, such as increased strength, waterproofing, and reduced vibrations transmitted to the rider. If desired, the tape may also be applied to the lower surface and sides of the skateboard 530, e.g., by wrapping the tape around the skateboard, to make the skateboard entirely waterproof and/or supplement the strengthening properties mentioned above.

In some aspects, the tape is applied to a surface to create a non-slip surface, such as onto a bicycle handlebar or stairs.

In yet other aspects, the tape may be applied to machinery for purposes of noise reduction. For example, a tape may be applied to the base of a window air conditioning unit, water filtration system (e.g., for a pool or hot tub), air compressor, furnace, etc. to reduce noise resulting from vibration of machine components. Instead of (or possibly in addition to) applying the tape directly to the equipment, the tape may be applied to structure that supports the equipment, e.g., housing or the like, to reduce noise associated with vibration.

The tape also may be applied to exterior surfaces of automobiles, or other types of motor vehicles such as boats, to form a decorative layer, indicia, stripes, or the like. In one example, the tape is applied along the surfaces of the bed of a pickup truck to form a protective layer, thereby eliminating the need for a premolded bed liner. The tape may be applied to various components of an automobile, such as a bumper, floorboard, fender, taillight, and so on, to repair damaged areas and/or for aesthetic purposes as described herein. In other examples, the tape may be applied to repair a leak in a soft top of a convertible automobile or a canvas awning, e.g., an awning for a camper or mobile home.

The tape may be applied to upholstery to repair damaged areas of furniture or to a damaged area of the seat of a vehicle such as an automobile, boat, airplane, motorcycle, snowmobile, bicycle, truck, tractor, riding lawn mower, golf cart, go-cart, dune buggy, ATV, or other type of vehicle.

The tape may be applied to pipes and hoses, such as the ends of downspouts, gutters, PVC pipes, irrigation pipes, conduits, etc. to attach segments together in a watertight manner. After the tape is applied, the downspout or PVC pipe to which it is applied may be adhered to a fitting or junction element in a watertight manner. If desired, a two-sided adhesive tape (refer to FIG. 2) is used so that it may be adhered to each of the opposing surfaces.

Other non-limiting examples of uses of the rubberized adhesive tape include attaching objects together, such as attaching survival gear to the outside of a backpack or bag, adhering a satellite dish to a roof, adhering components in arts-and-crafts applications, attaching a flashlight to bicycle handlebars, attaching a camera to a clothing or surface for filming, securing a license plate to an automobile frame or bumper, wrapping the tape around the end of a stick to pick up objects or insects, securing together trash bags, pieces of plastic, or other objects to create an emergency shelter, securing wires to a floor or other surface, or as a means to secure a mailbox to a post, securing a trailer to a broken trailer hitch, holding a broken car window up, holding a car hood shut, holding an electrical panel in place, holding speakers wires to the back of speaker or holding wires together, reattaching a rear view car mirror, reattaching a baseboard, hinging a cabinet door break, or adhering a peg board to a wall.

The tape also may be used to construct makeshift articles such as a rappelling harness or may be applied to a wall or other surface to create a cork board without needing nails. Other non-limiting examples of articles that may be constructed include clothesline, rope (e.g., by twisting a length of tape together), sheath for a knife, belt, handcuffs, automobile roof rack, or flypaper.

The tape also may be used to repair broken or damaged articles, non-limiting examples of which include a bottle, exhaust manifold, clothes hanger, ski pole, ceramic tile, canvas bag, car antenna, car bumper, canteen or other water container, bait box, helmet, plastic storage bin or lid, table, curtain rod, cushion, decorative item, faucet, sprinkler, fence, fish tank, fishing pole, belt, tent pole, thermos, lunchbox, purse or purse handle, siding, moon buggy, vacuum cleaner hose, box fan, refrigerator shelf, traffic sign, cooler, ladder, sleeping bag, window or door screen, swimming pool pump, eyeglasses, floor mat, car floorboard, fountain, bird bath, furniture, life vest, mailbox, hardhat, hat, flashlight, porch railing, tree branch, shoelaces, dry wall, pants with a hole and/or in need of hemming, landscaping, charger for electronic devices, HVAC duct or drip pan, fan belt, fishing pole, water bottle, photo frame, trash can, vacuum hose, canvas, fan blade, skis, patio furniture, toilet seat or seat cover, cooler, pet carrier, sled, furniture, guitar strap, tool belt, work gloves, ski gloves, ski pants, fish tank, rain boot, shoe, umbrella, roof or roof shingle, RV, camper, sandbox, satellite dish, car hose, car window, masonry, outdoor equipment such as tent, tarp, or awning, carpet or carpet seam, outdoor sporting equipment, plumbing pipe, pool cover, car cover, dog leash, shin guard, shower curtain, shower door, skylight, snorkeling gear, traffic light, tree stand, surf board, wake board, swimming flipper, swimming pool pump, vacuum cleaner hose, vat, washing machine or dryer hose, or window seam.

Other examples of uses for the tape include covering up exposed wires in an outlet box with missing cover, providing extra insulation, preventing water from leaking under glass walls of a shower, marking a trail, preventing windows from shattering, protecting flooring from furniture, reinforcing a book binding, resealing packages of food, sealing off holes to deny access to insects and rodents, sealing window in house for winter, stopping leaks around drafty windows, preventing wood from splitting, taping closed box for safekeeping, taping paper to windows to prevent light leakage, taping plastic to doors/windows to prevent air intrusion, converting a leaf blower into a gutter cleaner, wrapping a sprained ankle, or wrapping openings in cold weather gear to keep the wind from penetrating.

In addition to the applications and benefits as set forth herein, there are benefits in these techniques as demonstrating the uses, the ease of the use, and the advantages of the rubberized adhesive tapes by each of these processes. By making articles waterproof, the techniques described herein further provide benefits associated with avoiding contact with moisture, including making articles rust-resistant, mold-resistant, mildew-resistant, and the like.

Exemplary Embodiment 1

A method of testing the adhesive strength of a rubberized adhesive tape, the method comprising:
providing a length of rubberized adhesive tape having a first longitudinal end and a second longitudinal end opposite the first longitudinal end;
providing a free weight resting on a supporting surface;
adhering the first longitudinal end of the rubberized adhesive tape to the free weight or portion thereof;
grasping the second end of the rubberized adhesive tape and lifting in a generally upward direction, whereby the free weight is lifted off of the supporting surface and is supported only by the rubberized adhesive tape.

Exemplary Embodiment 2

A method of repairing a liquid container, the method comprising:
drilling an aperture into a container;
filling the container with a liquid, wherein the liquid is discharged through the aperture; and
while the liquid is being discharged through the aperture, applying a rubberized adhesive tape onto the container so as to cover the aperture and create a watertight seal.

The foregoing description should be considered illustrative rather than limiting. It should be recognized that various modifications can be made without departing from the spirit or scope of the invention as described and claimed herein.

What is claimed is:

1. A method of re-assembling a boat, the method comprising:
providing an assembled boat comprising an interior exposed surface;
separating the boat into a first side-hull section and a second side-hull section wherein the first side-hull section has a first interior edge and the second side-hull section has a second interior edge;
juxtaposing the first side-hull section and the second side-hull section such that the first interior edge is placed into abutting contact with the second interior edge, wherein the juxtaposed first side-hull section and second side-hull section together form a re-assembled boat; and
applying a rubberized adhesive tape onto a portion of the first side-hull section proximate the first interior edge and a portion of the second side-hull section proximate the second interior edge to create a watertight seal and thereby secure the first side-hull section to the second side-hull section.

2. The method of claim 1, wherein the rubberized adhesive tape is applied to an outer surface of the first side-hull section and the second side-hull section.

3. The method of claim 2, further comprising applying a rubberized adhesive tape to an inner surface of the first side-hull section and the second side-hull section.

4. The method of claim 1, further comprising the steps of:
placing the re-assembled boat in a body of water; and
propelling the boat through the body of water.

5. The method of claim 4, wherein the boat is propelled by operation of a motor.

6. The method of claim 1, wherein the interior surface further comprises a compartment capable of occupancy by a user prior to separating the boat into the first side-hull section and the second side-hull section.

7. The method of claim 1, wherein the boat is cut approximately in half lengthwise.

8. The method of claim 1, wherein the boat is separated into the first side-hull section and the second side-hull section with a saw or laser.

\* \* \* \* \*